United States Patent

[11] 3,563,272

[72] Inventor: Jean Mercier
501 Bloomfield Ave., Caldwell, N.J. 07006
[21] Appl. No.: 851,907
[22] Filed: Aug. 21, 1969
Division of Ser. No. 599,210, Dec. 5, 1966, Pat. No. 3,477,472.
[45] Patented: Feb. 16, 1971

[54] SERVO CONTROL VALVE AND SYSTEM
6 Claims, 3 Drawing Figs.

[52] U.S. Cl. ................................................ 137/625.66; 137/625.69
[51] Int. Cl. ................................................ F16k 11/07
[50] Field of Search ............................................. 137/625.66, 596.18, 625.61, 625.62, 625.69, 625.6, 625.63, 625.64

[56] References Cited
UNITED STATES PATENTS

| | | | |
|---|---|---|---|
| 2,790,427 | 4/1957 | Carson | 137/625.61 |
| 2,836,154 | 5/1958 | Lantz | 137/625.62 |
| 2,996,045 | 8/1961 | Burton | 137/625.64X |
| 3,044,480 | 7/1962 | Shih-Ying Lee | 137/625.62 |
| 3,095,906 | 7/1963 | Kolm Jr. | 137/625.62 |
| 3,207,178 | 9/1965 | Nevulis et al. | 137/625.69 |

Primary Examiner—M. Cary Nelson
Assistant Examiner—Robert J. Miller
Attorney—Arthur B. Colvin ABSTRACT: This invention relates to the art of servo systems to effect precise control of a hydraulic actuator, and comprises a distributor valve and a control actuator valve therefor, the distributor valve being conformed to pressurize the hydraulic actuator at all times and having a valve member balanced by capillary passageways to prevent sticking, the control actuator having an associated control system to restrain rapid movement of the hydraulic actuator.

INVENTORS
JEAN MERCIER

Arthur B. Colvin
ATTORNEY

SERVO CONTROL VALVE AND SYSTEM

This application is a division of copending application Ser. No. 599,210, filed Dec. 5, 1966 (now U.S. Pat. No. 3,477,472, dated Nov. 11, 1969).

As conducive to an understanding of the invention, it is noted that in many control systems, a hydraulic actuator is employed to effect movement of a device.

Where a control valve is employed to regulate the flow of fluid under pressure to said actuator and a control signal is employed to actuate the valve, unless the valve responds substantially instantaneously to the control signal, the movement of the actuator and the device controlled thereby will not be in synchronization.

Furthermore, if the conduits through which the fluid under pressure flows and the actuator to which the conduits are connected are not under pressure in neutral position of the control valve, when the valve is moved from neutral position to an operating position, the instantaneous rise in pressure in the conduits and the actuator will cause compression of any gas therein and also cause expansion of the conduits. In the usual hydraulic system when the fluid in the actuator is only under atmospheric pressure, it has been found that approximately ten percent by volume of the actuator contains gas and the balance liquid. As a result, the movement of the actuator as a function of the control signal will not be linear and hence precise control of the actuator and the device controlled thereby will not be possible.

In addition, when the gas in the actuator is not compressed and an external force should be exerted against the device controlled by the actuator, there will be resultant movement of such device which often is undesirable.

Where the control valve is utilized in a servo system in which the position of the movable valve member or spool of the valve is controlled by fluid under relatively low pressure, and such spool is moved from neutral position to an operating position to permit flow of high pressure fluid to the actuator, by means of the setting of a variable resistor that controls an electromagnetic device which in turn controls the application of fluid under pressure to the valve, and a second electromagnetic device opposing the first device is controlled by the movement of the piston of the actuator to cut off such high pressure flow when the piston of the actuator has moved a predetermined distance based on the setting of the electrical resistor, where the spool of the valve member is subjected to a pressure differential that causes lateral displacement thereof in the cylindrical bore in which it is slidably mounted, the spool will tend to stick so that it will not respond rapidly to the control pressures applied to the valve.

It is accordingly among the objects of the invention to provide a control valve for use in a hydraulic system, which valve is relatively simple in construction, having few parts and which are not likely to become deranged and in which the movable member or spool of the valve is substantially not subject to transverse displacement in neutral position to insure a minimum of friction and sticking thereof in such position, which valve will provide for the application of high pressure to both sides of the piston of the hydraulic actuator controlled by the valve when the valve is in neutral position, to insure that the hydraulic conduits leading to the actuator will be expanded to their normal working condition and that substantially all of the gas in such conduits will be compressed prior to flow of fluid to the hydraulic actuator to effect movement thereof.

According to the invention, these objects are accomplished by the arrangement and combination of elements hereinafter described and more particularly recited in the claims.

In the accompanying drawings in which are shown one or more of various possible embodiments of the several features of the invention:

Figure 1:
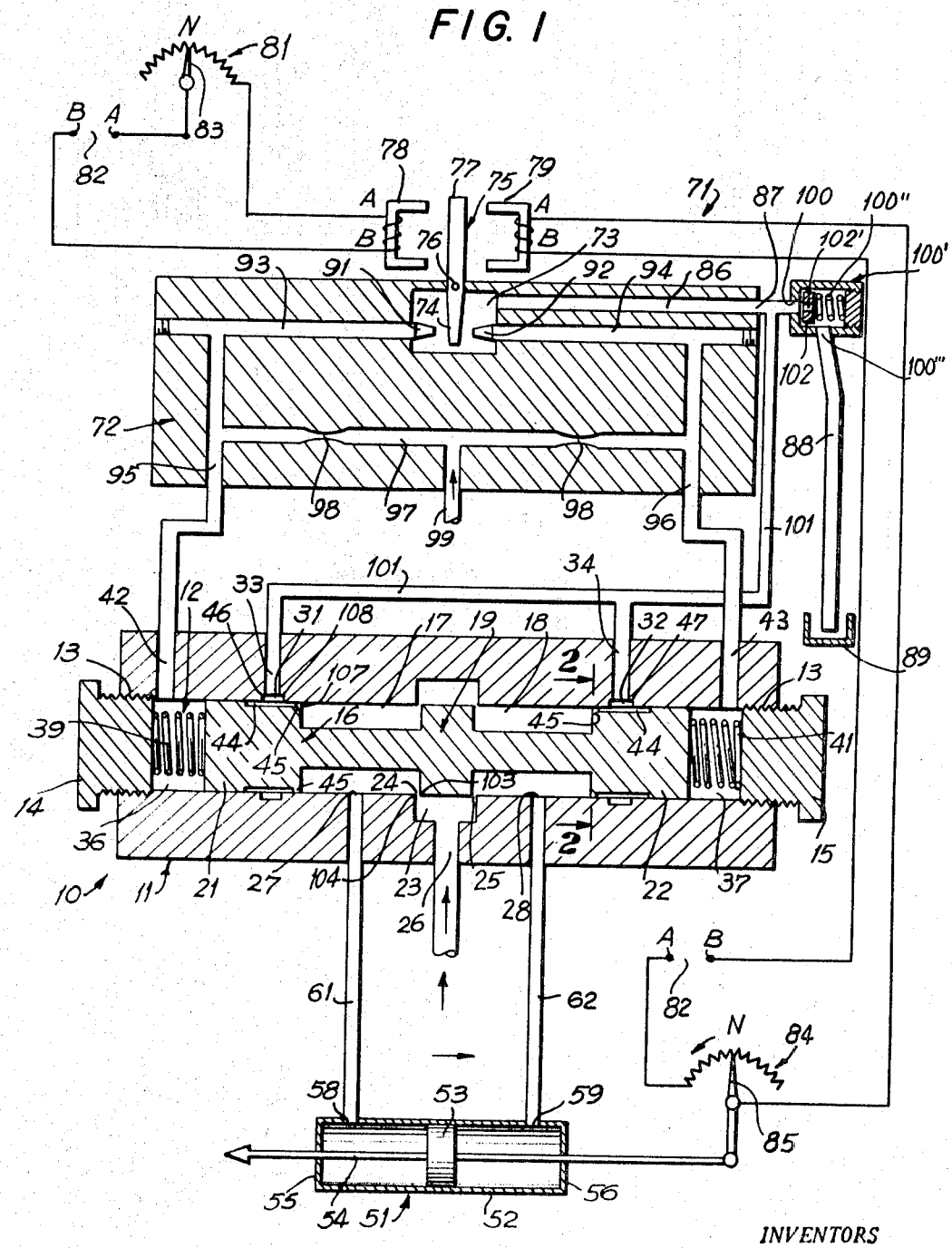
FIG. 1 is a longitudinal sectional view of a control valve incorporated in a hydraulic circuit.

Referring now to the drawings, as shown in FIG. 1, the valve 10 comprises a casing 11 having a bore 12 therethrough, the ends 13 of which are internally threaded to receive closure plugs 14, 15.

Slidably mounted in bore 12 is a spool member 16 which has two longitudinally spaced annular grooves 17, 18 therein, defining a central control portion 19 and two end control portions 21, 22, defining annular sealing portions.

The casing 11 has a central internal annular groove 23 of width just slightly greater than that of the central control portion 19 so that when the spool 16 is in the neutral position shown in FIG. 1, there will be relatively small annular passageway 24, 25 positioned between the annular groove 23 and annular grooves 17, 18, respectively.

The casing has a pressure inlet port 26 leading into annular groove 23 and two control ports 27, 28 on each side respectively of pressure inlet port 26 and which are in communication with the associated annular grooves 17, 18. In addition, the casing has two annular grooves 31, 32, with which the end control portions 21, 22 are aligned when the spool 16 is in neutral position, said end control portions 21, 22 sealing said annular grooves 31, 32 and the return ports 33, 34 connected thereto, when the spool is in such neutral position.

Positioned in the chambers 36, 37, between the inner end of each of the plugs 14, 15 and the outer end of the associated end control portions 21, 22 and compressed therebetween, are coil springs 39, 41, the tension of which may be adjusted by the associated plug 14, 15 so as to align the spool in neutral position. Each of the chambers 36, 37 has a port 42, 43 leading thereinto whereby the movement of the spool 16 may be controlled in the manner hereinafter to be described.

As shown in FIG. 1, each of the control portions 21, 22 has an annular groove 44 therein, which extends from the annular rim 45 (FIGS. 1 and 2) at the inner end of each end control portion, to a point beyond the outer edges 46, 47 of the annular grooves 31, 32.

Each of the annular rims 45 has a plurality of passageways 48 therethrough providing communication between annular grooves 17, 44 and 18, 44 respectively and the depth of each annular groove 44 is extremely small so that said grooves define capillary passageways.

In the embodiment shown, the spool 16 is moved from the central neutral position to either of two extreme positions on each side respectively of the neutral position as by fluid under pressure forced into the chambers 36, 37.

The valve shown in FIG. 1 is designed to provide accurate control of a hydraulic actuator 51, which comprises a cylindrical casing 52 having piston 53 slidable therein. A piston rod 54 connected to said piston, extends axially through both ends 55, 56 of the cylinder 52, one end of the piston rod 54 controlling the device to be actuated.

The ports 58, 59 of the actuator on each side of the piston 53 thereof, are connected by conduits 61, 62 to the control ports 27, 28 of the valve 10.

In order to actuate the valve 10, in the illustrative embodiment shown, a conventional control actuator 71 is provided which will be described only sufficiently for a clear understanding of the operation of the valve 10 as the actuator per se forms no part of the invention.

The actuator comprises a casing 72 having a recess 73 into which extends one end 74 of a control member 75 pivoted as at 76. The other end 77 of the control member 75 is positioned between two opposed electromagnets 78, 79. The coil of electromagnet 78 is connected in series with a variable resistor 81 and a source of current 82 applied to terminals A, B, the flow of current through the coil of electromagnet 78 being controlled by the setting of the movable arm 83 of variable resistor 81. The coil of electromagnet 79 is connected in series with a variable resistor 84 and the source of current 82, the electrical circuit being designed so that the current flow through the coils of electromagnets 78, 79 will be in opposition. Flow of current through the coil of electromagnet 79 is controlled by the movable contact arm 85 of variable resistor 84, said arm 85 being connected to the piston rod 54 of the actuator 51.

The casing 72 of the control actuator 71 has a discharge passageway 86 with a discharge port 87. In addition, the recess 73 has two opposed spaced nozzles 91, 92 between which the lower end 74 of control member 75 is centrally positioned when the current flow through electromagnets 78 and 79 is equal and opposed. Each of the nozzles 91, 92 is connected by passageways 93, 94 to passageways 95, 96 which are connected respectively to the ports 42, 43 of valve 10. In addition, each of the passageways 95, 96 is connected through common passageway 97 and flow restrictors 98, to a port 99 to which a source of low pressure, say, in the order of 100 p.s.i. may be connected. The ports 33, 34 which are of smaller diameter than the high pressure inlet pressure port 26 of the valve are connected by common line 101 to discharge port 87 and to inlet port 100 of pressure relief valve 100'. The valve 100' has a valve member 102 therein which has a central opening 102' of diameter slightly larger than the combined diameters of nozzles 91, 92. The valve member 102 is normally retained against the end of the valve 100' into which port 100 extends by means of a coil spring 100" and the valve has a discharge port 100"' connected by conduit 88 to reservoir 89.

Prior to application of high pressure say, in the order of 5,000 p.s.i. to the port 26 of the valve, and low pressure to the port 99 of the control actuator 71, and with the contact arm 83 of variable resistor 81 in the neutral position shown, the elements will be in the position shown in FIG. 1.

When low pressure in the order of 100 p.s.i. is applied to port 99 it will flow into the chambers 36, 37 and also through nozzles 91, 92 to be discharged through passageway 86, valve 100' and conduit 88 into reservoir 89. With the control member 75 in neutral position, it is apparent that the pressure in each of the chambers 36, 37 will be identical and hence the spool 16 will remain in its neutral position.

When high pressure in the order of 5,000 p.s.i. is applied to port 26, due to the restricted passageways 24, 25 25, fluid under high pressure will flow through ports 27, 28 and conduits 61, 62 into ports 58, 59 of the actuator to react on both sides of the piston 53 thereof.

As the result of the application of high pressure to ports 58, 59, gas in the actuator 51 as well as that in the conduits 61, 62 will be compressed and the conduits will also tend to expand.

Assuming at this time that it is desired to move the piston rod 54 a predetermined amount to the left, the contact arm 83 is moved to a desired position related to such desired movement. As a result, the electromagnet 78 will have the current therethrough varied so that it is no longer equal to the current through electromagnet 79. Consequently, the control member 75 will be pivoted in desired direction, say in counterclockwise direction so that the lower end 74 thereof will move closer to nozzle 92. This will cause the flow of fluid through nozzle 92 to be slightly blocked to cause the pressure in passageway 96 to build up so that it is higher than the pressure in passageway 95 to increase the pressure in chamber 37. When the force exerted against the end portion 22 exceeds the force exerted by spring 39, the spool 16 will move to the left.

Such movement of the spool to the left will cause the edge 103 of central control portion 19 to move beyond the edge 104 of annular groove 23 to close passageway 24, said edge 103 acting as a sliding valve. At the same time the passageway 25 will open a greater amount to continue the application of fluid under pressure through annular passageway 18 and port 28 into port 59 of the actuator. As the spool 16 continues to move to the left, the spring 39 will be further compressed and the inner edge 109 of sealing portion 21 will move to the left until it moves slightly past the inner edge 108 of groove 31 so that slight flow will be permitted from the annular groove 17 through port 33 and conduit 101 into port 100 of relief valve 100' and through the opening 102', discharge port 100"' and conduit 88 to reservoir 89. Consequently, fluid will flow from port 58 of the actuator 51 so that the piston 53 and piston rod 54 may now move to the left. As this occurs and the device being moved by the actuator approaches its desired position determined by the setting of contact arm 83, the contact arm 85 of variable resistor 84 controlled by piston rod 54 will move in a clockwise direction back toward neutral position, and the current through electromagnet 79 will again tend to become equal and opposite to the current flow through electromagnet 78 and the control member 75 will be moved toward its neutral position shown. Consequently, the pressure in chambers 36 and 37 will become equalized and the tensed spring 39 will restore the spool to its neutral position cutting off further movement of the piston rod 84.

At this time, the return ports 33, 34 will be closed so that there will no longer be any flow from annular grooves 17, 18 and the pressure on both sides of the piston 53 will be equalized so that the device controlled by the actuator 51 will remain in its desired position.

It is to be noted that there will be high pressure on the inner side of rim 45 due to the pressure in annular grooves 17, 18. Due to the passageways 48, such high pressure will also exist in the capillary passageway 44 adjacent the rims 45. By reason of the capillary passageways, there will be substantially no flow through the ports 33, 34 in communication with the annular grooves grooves 31, 32 and low pressure in said ports which are connected to the reservoir 89, when the valve 10 is in neutral position with the end control portions 21, 22 are aligned with such annular grooves. Since the pressure in chambers 36, 37 is also relatively low, i.e., 100 p.s.i. as compared with the pressure of 5,000 p.s.i. in annular grooves 17, 18, it is apparent that the differential between the pressure in chambers 36 and 37 and the pressure at the outer ends of the capillary passageways 44 adjacent thereto will also be relatively low. As a result, the outer ends or sealing portion of end portions 21, 22 will not be subjected to an extreme differential pressure with the result that they will not be laterally displaced with any substantial force that would cause high friction and hence sticking of the spool.

This feature is extremely important when in operation of the system the device to be actuated is to be moved rapidly from one position to another an extremely slight amount, since highly accurate response is required.

Due to the balance of the spool by reason of the capillary passageways, and the substantial elimination of sticking thereof, the slightest increase in pressure in chamber 37, for example, will cause substantially instantaneous movement of the spool and as soon as the edge 107 moves slightly past the adjacent edge of annular groove 31 to effect slight cracking, there will be the desired movement of the piston rod 54 and the device actuated thereby.

Furthermore, by reason of the fact that the conduits 61, 62 and the actuator 51 remains pressurized even when valve 11 is in neutral position, there would be no lag in the movement of the piston rod 54 of actuator 51 due to compression of gas in the actuator 51 and conduits and expansion of the conduits each time fluid under high pressure was applied thereto so that the movement of the piston rod 54 and the device actuated thereby will be in substantially exact synchronization with the control signal provided by the setting of contact arm 83.

Due to the fact that the pressure inlet port 26 is of greater diameter than the pressure outlet ports 33, 34, it is apparent that the quantity of fluid that is supplied under pressure would be much greater than that which is discharged to return for dependable control.

It is further to be noted that the sliding valve formed by the annular rim 45 will not effect opening of ports 33, 34 until after the associated annular passageways 24, 25, as the case may be, has been closed. This will insure that prior to opening of the return ports 33, 34, the fluid under pressure will only be applied to the other control port 27 or 28 for dependable and controllable actuation.

In the event that an external force should suddenly be applied to the piston rod 54 of the actuator when one of the ports 33, 34 was open, if the fluid could discharge rapidly from the actuator, there would be correspondingly rapid movement of the device being actuated. In many cases such as in the steering of a ship this would be undesirable.

With the system shown and described, if there should be a rapid flow from one of the ports, say port 33 for example, the fluid would flow through conduit 101 into port 87 of control member 71 and port 100 of valve 100'. The opening 102' of valve member 102 is of sufficient diameter to permit normal flow therethrough, but not the rapid flow above described and the force of spring 100'' is sufficient to retain the valve member against port 102' except when the rate of flow exceeds a predetermined amount.

As a result, a portion of such fluid under pressure will flow through passageway 86 into recess 73 and cause the pressure therein to rise to tend to counteract the flow of fluid through the nozzles 91, 92. As a result, the pressure in lines 93, 94 will tend to equalize as will the pressure in chambers 36, 37 of the valve 11. Consequently, the valve member will move to the right to close the port 33. This would restrain flow from port 58 of the actuator and hence reduce the speed of movement thereof.

Thus, with the system above described, rapid movement of the actuator by an external force is minimized.

If, however, the operator desires to effect sudden rapid movement of the actuator and initially moved the arm 83 to an extreme position, the sudden opening of the valve 11 would provide such a rapid flow as to overcome the force of spring 100''. As a result, the valve member 102 would move beyond port 100''' for full discharge of fluid and hence full movement of the device being actuated without affect on the action of the nozzles 91, 92.

Figure 2:
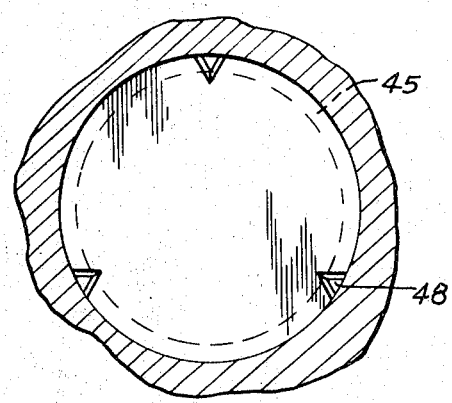
FIG. 2 is a detailed sectional view taken along line 2-2 of FIG. 1.
Figure 3:
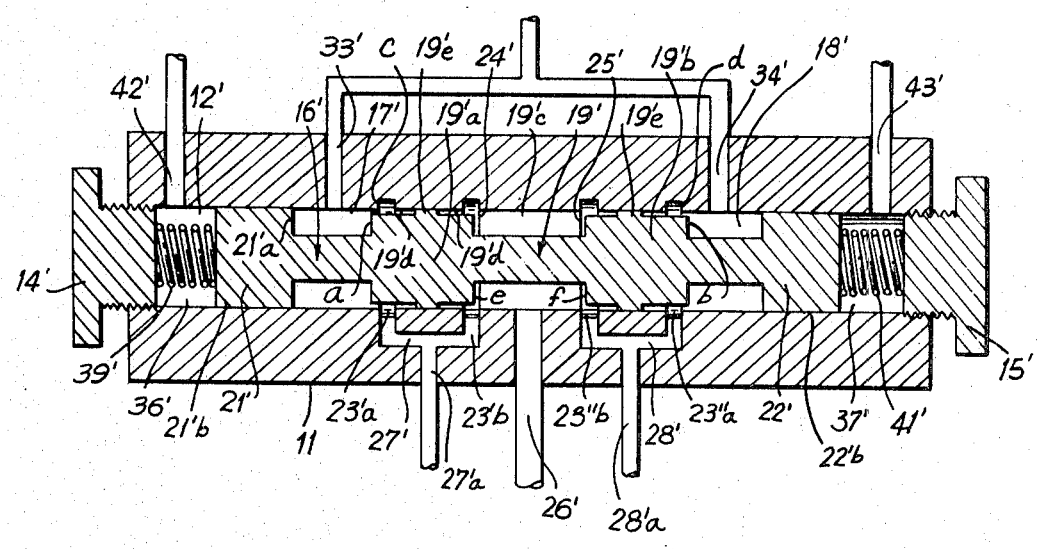
FIG. 3 is a view similar to FIG. 1 of another embodiment of the control valve.

The embodiment shown in FIG. 3 is similar in many respects to the embodiment shown in FIGS. 1 and 2 and corresponding parts have the same reference numerals primed.

Referring to FIG. 3, the spool 16' which is slidably mounted in the bore 12' of casing 11' also has closure plugs 14', 15' screwed into the internally threaded ends of the bore. The spool 16' also has two longitudinally spaced annular grooves 17', 18' therein defining a central control portion 19' and two end portions 21', 22'.

The central control portion 19' comprises two spaced annular sealing portions 19'a and 19'b defining therebetween an annular groove 19'c of depth illustratively the same as that of annular grooves 17', 18'. The casing 11' has two pairs of longitudinally spaced central annular grooves 23'a, 23'b and 23''a and 23''b aligned respectively with the sealing portions 19'a and 19'b. The annular grooves 23'a, 23'b and 23''a, 23''b of each pair are in communication with each other through passageways 27' and 28' respectively, the outlets of which passageways define control ports 27'a and 28'a. These control ports are positioned on either side respectively of pressure inlet port 26' which is in communication with annular groove 19'c. The length of each of the central sealing portions 19'a and 19'b is such that with the spool 16' in the neutral position shown in FIG. 3, there will be a relatively small passageway 24', 25' between the annular groove 19'c and the adjacent annular groove 23'b and 23''b respectively so that the pressure inlet port 26', when the spool is in neutral position, will be in communication with the control ports 27'a, 28'a.

The outer edges 'a' and 'b' of each of the central sealing portions 19'a and 19'b, when the spool is in neutral position extends slightly beyond the outer edge 'c', 'd' of annular grooves 23'a and 23''a.

As is clearly shown in FIG. 3, the casing 11' has two return ports 33', 34' in communication with the annular grooves 17', 18' in all positions of the spool 16'. Positioned in the chambers 36', 37' between the inner end of each of the plugs 14', 15' and the outer end of the associated end portions 21', 22' of the spool 16' and compressed therebetween are coil springs 39', 41', the tension of which may be adjusted by the associated plug 14', 15' so as to align the spool in neutral position. Each of the chambers 36', 37' has a port 42', 43' leading thereinto whereby the movement of the spool 16' may be controlled in the manner hereinafter to be described.

As is shown in FIG. 3, the sealing portions 19'a and 19'b each has an annular groove 19'd at each end thereof defining a sealing rim 19'e therebetween, the sealing rims 19'e being of outer diameter just slightly less than the inner diameter of bore 12' of the casing 11' defining a sliding seal.

The depth of each of the annular grooves 19'd is extremely small so that said grooves define capillary passageways.

In the embodiment shown in FIG. 3, the control ports 27'a and 28'a are connected to the ports of a hydraulic actuator; the ports 42' and 43' are connected to a control actuator 71 as described with respect to the embodiment of FIG. 1 to be supplied with fluid under relatively low pressure in the order of 100 p.s.i.; the ports 33' and 34' are connected to return and the pressure inlet port 26' is connected to a source of high pressure in order of 5,000 p.s.i.

As the operation of the valve shown in FIG. 3 is substantially identical to that shown in FIGS. 1 and 2, it will only be described sufficiently for a clear understanding thereof.

Thus, with the spool in neutral position, when high pressure is applied to port 26', fluid will flow through the small passageways 24', 25' to control ports 27'a and 28'a in the same manner as in the embodiment of FIGS. 1 and 2, the return ports 33' and 34' being sealed by the sealing portions 19'a and 19'b.. When the spool is moved, for example, to the left from the neutral position shown, a passageway 25' will close and the passageway 24' will open for enhanced flow of fluid through control port 27'a. Such movement of the spool to the left will subsequently cause the edge 'b' of sealing portion 19'b to move past the edge 'd' of annular groove 23''b to permit discharge of fluid flowing into control port 28'a from the port 59 of actuator 51 through annular groove 18' to return port 34'.

In the same manner as the embodiment of FIGS. 1 and 2, the inner edges "e" and "f" of the sealing portions 19'a and 19'b define sliding valves with respect to the bore of the casing as do the outer edges "a", "b" of said sealing portions.

By reason of the annular grooves 19'd which define capillary passages, it is apparent that with the spool 16' in neutral position as shown, when high pressure is applied to port 26', it will flow into annular grooves 23'a, 23'b and 23''a, 23''b and into the associated capillary passageways defined by grooves 19'd on either side or rib 19'e. As a result, there will be a relatively low pressure on either side of each annular rib 19'b and since such pressure will be balanced, transverse displacement of the spool at the region of the annular ribs will be minimized to prevent sticking.

I claim:

1. A hydraulic servo control valve comprising a casing having a bore therein, a spool slidably mounted in said bore and movable between a central neutral position to two extreme positions on each side respectively of said neutral position, said casing having a pressure inlet port and two control ports on each side respectively of said pressure inlet port, said spool having a central control portion and two annular sealing portions on each side respectively of said central control portion, an internal annular groove in said bore aligned with said pressure inlet port and of width slightly greater than said central control portion, said central control portion having opposed edges slightly spaced from the adjacent edges of said annular groove to provide restricted flow between said pressure inlet port and both said control ports when said spool is in neutral position, said casing having two fluid returns return ports, said annular sealing portions of said spool controlling communication between said control ports and the associated return port on the same side of the inlet port and normally cutting off flow between both of said return ports and said pressure inlet port when said spool is in neutral position, the travel of the spool from neutral position toward each extreme point and corresponding movement of the central control portion cutting off communication between the inlet port and the associated control port prior to opening communication between the return port and said control port.

2. A hydraulic servo control valve comprising a casing having a bore therein, a spool slidably mounted in said bore and movable between a central neutral position to two extreme positions on each side respectively of said neutral position, said spool having two spaced annular grooves defining a central control portion therebetween and two end control portions, said casing having two control ports in communication respectively with said annular grooves in all positions of said spool, and an annular groove means between said control ports defining a pressure inlet aligned with said central control portion of said spool in neutral position, the opposed edges of said central control portion being located inwardly from the side edges of said pressure inlet groove means and slightly spaced laterally therefrom, whereby both of said annular grooves will be in communication with said pressure inlet port in neutral position of said spool and one of said two control ports will be in communication with the associated annular groove and said pressure inlet in all positions of said spool, said casing having two annular grooves aligned respectively with and closed by the end control portions of said spool when the latter is in neutral position and defining fluid return outlets, the distance between the inner edge of each of said return annular grooves and the inner edge of the associated end control portion being greater than the distance between the edge of the central control portion and the adjacent edge of the pressure inlet groove means and means to effect movement of said spool to either side of its neutral position.

3. The combination set forth in claim 2 in which each of said end control portions between its inner and outer edge has a reduced diameter portion defining an annular capillary recess of length greater than the distance between the inner edge of the associated end control portion and the outer edge of the associated return annular groove when the spool is in neutral position.

4. The combination set forth in claim 3 in which the diameter of the end control portion is just slightly smaller than the diameter of said bore to define a sliding fit therein, said reduced diameter portion is slightly spaced from the inner edge of each end control portion to define a guide rim at each of such inner ends, said rims each having passageways therethrough leading from the associated annular groove into the recess defined by said reduced diameter portion.

5. A servocontrol valve comprising a casing having a bore therein, a spool slidably mounted in said bore and movable between a central neutral position to two extreme positions on each side respectively of said neutral position, said spool having two spaced annular grooves defining a central control portion therebetween and two end portions, said central control portion comprising two spaced annular sealing portions defining a central annular groove therebetween, said casing having two pairs of spaced annular grooves aligned respectively with said spaced annular sealing portions when said spool is in neutral position, said casing having two control ports in communication respectively with each pair of spaced annular grooves, and a pressure inlet port in communication with the central annular groove in said spool in all positions of said spool, the opposed inner edges of said annular sealing portions adjacent the central annular groove being located inwardly from the inner edge of the adjacent one of each pair of spaced annular grooves to define a relatively narrow passageway between the central annular grooves when the spool is in neutral position, the outer edges of each of said annular sealing portions extending beyond the outer edge of the other annular groove of each pair of annular grooves when the spool is in neutral position, said casing having two return ports in communication respectively with each of said first pair of annular grooves in all positions of said spool, the distance between the inner edges of each of said annular sealing portions and the inner edge of the associated annular groove being less than the distance between the outer edge of each of said annular sealing portions and the outer edge of the associated annular groove and means to effect movement of said spool to either side of its neutral position.

6. The combination set forth in claim 5 in which each of said sealing portions between its inner and outer edges and its central annular rim has a reduced diameter portion defining an annular capillary recess.